C. A. PFANSTIEHL.
SUPPORT FOR LIGHT CUTTING WHEELS.
APPLICATION FILED JULY 24, 1916.

1,266,310.

Patented May 14, 1918.

Witness
Albin Ahlberg

Inventor
Carl A. Pfanstiehl
By Williams Bradbury
Attorneys

UNITED STATES PATENT OFFICE.

CARL A. PFANSTIEHL, OF HIGHLAND PARK, ILLINOIS, ASSIGNOR TO PFANSTIEHL COMPANY, INC., OF NORTH CHICAGO, ILLINOIS, A CORPORATION OF NEW YORK.

SUPPORT FOR LIGHT CUTTING-WHEELS.

1,266,310.  Specification of Letters Patent.  Patented May 14, 1918.

Application filed July 24, 1916. Serial No. 111,051.

*To all whom it may concern:*

Be it known that I, CARL A. PFANSTIEHL, a citizen of the United States, residing at Highland Park, in the county of Lake and State of Illinois, have invented a certain new and useful Improvement in Supports for Light Cutting-Wheels, of which the following is a full, clear, concise, and exact description, reference being had to the accompanying drawings, forming a part of this specification.

My invention relates to bearing structures and particularly to a structure adapted to rotate at high speed and one in which vibration must be absolutely eliminated.

The primary use for the structure of my invention is to support composition cutting wheels used for cutting very hard materials such as tungsten rod. The saws or cutting wheels which I have found preferable for use in cutting tungsten contacts from the ends of tungsten rod are composed of vulcanite mixed with an abrasive material such as finely powdered carborundum. I have also found it beneficial to coat the surfaces of the cutting wheels with sodium silicate into which is sprinkled carborundum dust thus giving a glassy external surface to the cutting wheel.

The object of my invention is to provide a cutting wheel support which may be rotated at very high speed without any appreciable vibration. Vibration is caused by lack of balance in the rotating parts, and by looseness of the bearings caused either by wear or by expansion of the parts due to heat.

My invention is illustrated in the accompanying drawings in which—

Figure 2:
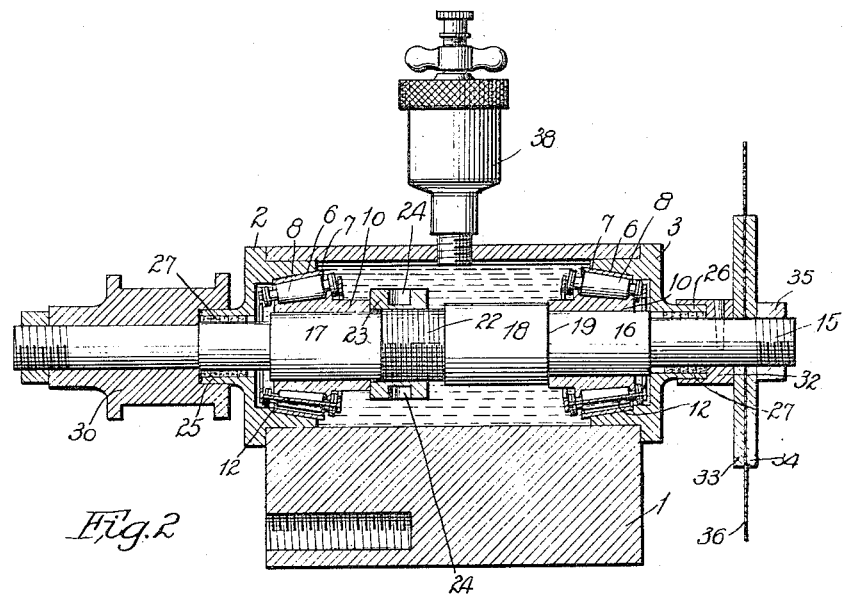
Fig. 2 is a longitudinal section.
Figure 1:
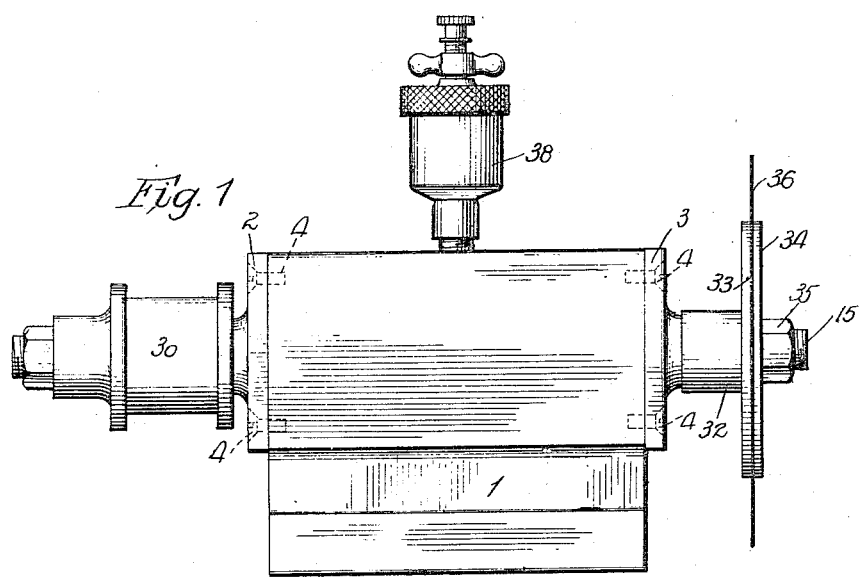
Figure 1 is an elevation of my bearing and bearing support.

The body of the bearing comprises a cast iron member 1 having a horizontal cylindrical opening through the upper part thereof into which are fitted the end members 2 and 3, the latter being held in place by a plurality of screws 4. The end members 2 and 3 have internal cone faces 6 into which the external races 7 are accurately fitted. The rollers 8 engage the inner faces of the races 7 and roll upon the outer cone faced surfaces of the cones 10. The rollers 8 are spaced from one another by suitable spacers 12 so formed as to engage the ends of the rollers as well as the sides thereof. The roller bearing itself, including members 8, 9, 10, and 12, forms no part of my invention, these rollers being of a well-known make and used extensively for automobile bearings and for other purposes in which the speed of rotation is small compared to that at which my device is operated. The rotatable shaft 15 is turned with a pair of cylindrical bars 16 and 17 accurately constructed so as to fit within the cylindrical openings through the cone members 10 with a forced or drive fit. The central portion 18 of the shaft 15 is enlarged to form a shoulder at 19 against which the right hand bearing cone 10 is forced. The portion of the shaft 15 adjacent the lefthand bearing cone is threaded, as shown at 22, and carries the internally threaded collar 23 having opposite depressions 24 therein for the reception of a suitable wrench. The members 2 and 3 have projecting external ends 25 and 26 and have a bore somewhat greater than the portion of the shaft extending therein. The spaces between the inner faces of the parts 25 and 26 and a shaft 15 are filled with felt washers 27 the purpose of which is to prevent either caborundum or tungsten dust from working into the bearings, this dust being of such a character that it would quickly cut the bearings and destroy their accuracy.

On the left end of the shaft 15 is a pulley 30 having a groove therein for guiding a flat belt. This pully has a cylindrical depression in the left end thereof which extends over the protruding portion 25 of the inclosing member 2, thus aiding in the sealing of the bearing against foreign material from without. On the left end of the shaft 15 is a collar 32 having a bore extending over the projection 27 on the inclosing member 3 for the same purpose as formerly described in connection with the bore in the pulley 30. The external face of the collar 32 is accurately turned to form an abutment for the ring 33. The ring 33 and the opposing ring 34 are slightly dished so that when clamped together by means of the nut 35 they engage the cutting wheel 36 more firmly at the periphery of the disks 33 and 34 than at the center. The dish is so slight, however, that when the nut 35 is tightened the greater part of the dish is taken up in the elasticity of the rings 33 and 34. A grease cup 38 is threaded into the top of the member 1 for supplying the cavity in which the bearings are located with lubricant.

In the adjustment of this bearing the threaded collar 22 is tightened against the friction of the cone 10 upon the portion 17 of the shaft and the bearings are thus by very careful adjustment set so that when the plates 2 and 3 are firmly screwed to place the shaft 15 can scarcely be rotated by hand. This adjustment places the bearings under a pressure equivalent to a load of several hundred pounds and eliminates all but the very thinnest film of lubricant from between the rollers and their engaging races. During the operation of the device the bearings become quite warm by reason of the heavy load under which they are operating, but the materials of which the shaft 15 and the inclosing member 1 are constructed have the same co-efficient of expansion and, therefore, the change in temperature does not materially affect the operation of the bearings. I have found that with a straight shaft bearing tightened so as to eliminate the last trace of vibration it was impossible to maintain lubricant between the bearing surfaces while if the bearings were constructed loose enough so that the lubricant would remain between the surfaces it was impossible to elminate vibration. I also found the same difficulties with the use of cone bearings, that is, if the bearings are made tight enough to eliminate all trace of vibration they cannot be lubricated by any method which I have been able to devise.

I attribute the high degree of success of this device primarily to the fact that the structure is such that the bearings may be operated under a very high contact pressure. While I have described my invention with respect to certain details of construction by means of which the results described are readily carried out, it is to be understood that I do not wish to be unduly limited thereby, other means of adjusting and supporting the bearings and other details of construction being possible without departing from the spirit or scope of my invention.

What I claim is:

The combination with a rotary shaft, of a stationary three piece support therefor comprising a central tubular member and a pair of end members, each of said end members having a part abutting its end of the tubular member, an inwardly faced bearing cone secured in each of said end members, a pair of outwardly faced bearing cones secured on opposite ends of said rotary shaft, one of said cones having driving but sliding fit upon said shaft, a sleeve threaded upon the shaft between said cones and adapted to be forced against one of said cones to slide it upon the shaft, tapered rollers between the cups and cones, the structure being such that the shaft may be bodily removed for adjustment of the slidable cone thereon, and the whole replaced within the tubular support without altering the distance of adjustment of the bearing parts from one another other than such alteration as was made by the movement of the said slidable cone on the shaft.

In witness whereof, I hereunto subscribe my name this 20th day of July, A. D. 1916.

CARL A. PFANSTIEHL.

Witnesses:
  E. M. CONRAD,
  C. C. SANBORN.